May 9, 1961 W. BLINDER 2,983,557
ANTIFRICTION BEARING
Filed July 24, 1958
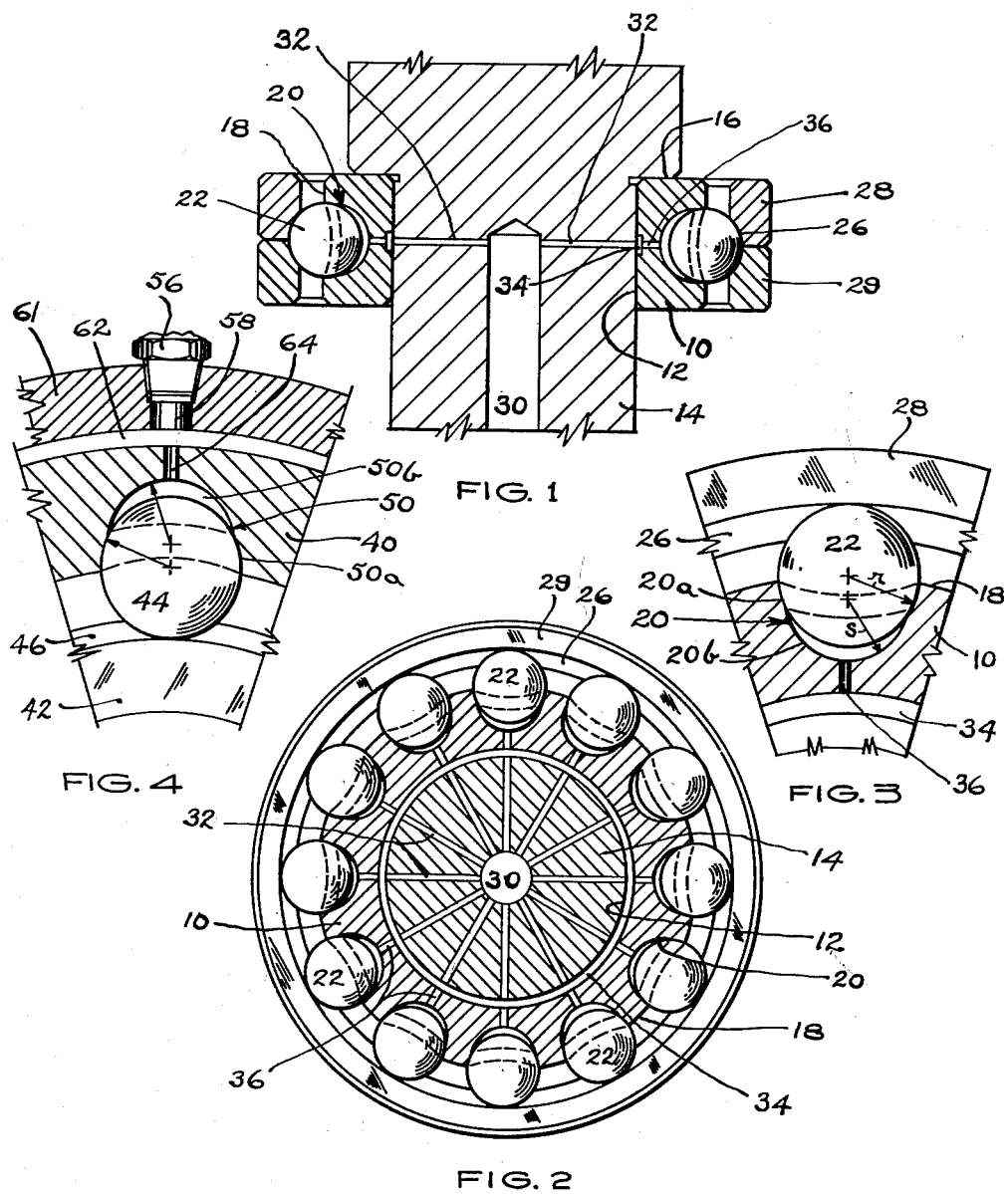
INVENTOR
William Blinder
BY: Edward H. Goodrich
HIS ATTORNEY United States Patent Office 2,983,557
Patented May 9, 1961

2,983,557
ANTIFRICTION BEARING
William Blinder, Newington, Conn., assignor to General Motors Corporation, Detroit, Mich., a corporation of Delaware
Filed July 24, 1958, Ser. No. 750,644
6 Claims. (Cl. 308—187)

This invention relates to antifriction bearings and particularly to an improved bearing which eliminates the need for the usual separator while antifrictionally guiding the rolling elements in circumferentially spaced relation to each other.

Heretofore, in the usual type of ball or roller bearing there has been provided a series of circumferentially arranged rolling elements as balls or rollers in freely rolling engagement with a pair of annular raceways formed in relatively rotatable coaxial race rings. In early forms of such bearings and in some presently manufactured bearings which operate under very light load at relatively low rotational speeds, the rolling elements are allowed to rub against each other and to substantially fill the circumferential space between the race rings. This condition is objectionable, noisy and creates wear. In high speed bearings which carry appreciable load, there is usually provided between these race rings an annular separator or cage having a circumferentially spaced pockets for individually receiving and guiding the rolling elements such as balls. This separator usually slidably rides on cylindrical lands at one or both sides of one of the raceways and there is also rubbing friction of the balls or rolling elements against the sides of the separator pockets in which they are received. To reduce this objectionable friction, it is usual to use a lubricant within the bearings. In view of the fact that many antifriction bearings must operate at very high speeds, the frictional contacting separator surfaces are difficult to lubricate adequately with the result that much wear and galling occurs causing shortened bearing life.

In view of these objectionable features attendant with the usual separator and cage constructions, it is, therefore, an object of this invention to provide an improved antifriction bearing wherein the rolling elements are held in desired circumferentially spaced relation without employing a cage or separator to position these rolling elements.

It is a further object of this invention to provide an improved antifriction bearing of simple construction wherein one of the relatively rotatable rings of the bearing serves the dual capacity of rotatably receiving and circumferentially guiding the rolling elements in spaced relation.

To these ends and also to improve generally upon devices of this character, this invention consists in the various matters hereinafter described and claimed. In its broader aspects, the invention is not necessarily limited to the specific structures selected for illustrative purposes in the accompanying drawings wherein Figure 1 is a cross sectional view showing my antifriction bearing mounted on a shaft;

Figure 2 is a fragmentary end view of my bearing;

Figure 3 is an enlarged fragmentary view of a cut-away portion of my bearing; and Figure 4 is an enlarged fragmentary view showing a modified construction.

Generally considered my improved antifriction bearing comprises a pair of relatively rotatable rings having a series of circumferentially spaced rolling elements as balls therebetween to provide for the free rotational movemnt of one or both of these rings. One of the rings is provided with an annular raceway in which these elements freely roll and the other race ring is provided with a series of circumferentially spaced pockets having annular seats which rotatably receive and guide the rolling elements. Lubricant under pressure is fed up under each rolling element and past this seat to freely and rotatably support these elements upon a pocket of lubricant which leaks out into the rest of the bearing providing lubrication for the entire bearing. With this arrangement, the rolling elements as balls may be in closely spaced relation and the need for the usual type of annular separator or ball receiving cage is eliminated thus greatly reducing the friction within the bearing.

Referring to the invention as illustrated in Figures 1, 2 and 3, an inner bearing ring 10 has a central bore 12 closely fitted over a cylindrical shaft portion 14 and against a shoulder 16. The annular periphery 18 of the bearing ring 10 is circumferentially and preferably uniformly interrupted by a series of radially inwardly directed cup-shaped pockets 20 each of which slidably and rotatably receives a bearing ball 22 that freely rotatably engages a transversely curved annular raceway 26 in an outer race ring. For convenience of assembly, this outer race ring is usually made in two companion axially abutting parts 28 and 29 which cooperatively provide the raceway 26. These race ring halves 28 and 29 are suitably held in endwise abutting engagement by mounting within a housing or the like (not shown).

Each pocket 20 has an outer partispherical annular portion 20a and an inner portion or recess 20b which also may be partispherical. The portion 20a has a radius $r$ closely conforming to the radius of the ball 20 seated therein along a sub-equatorial zone on the ball and the portion 20b has a radius $s$ less than the radius $r$ thus forming a lubricant pocket or reservoir beneath each ball. Lubricant as a light oil, oil and air mist, or even air or some other suitable gas, is forced under pressure into and through a generally central longitudinal passage 30 within the shaft portion 14 and through one or more radially extending lubricant passages 32 opening at their inner ends into the passage 30 and at their outer ends through the cylindrical shaft portion 14 into an annular groove 34 which radially opens inwardly into the ring bore 12. A series of lubricant ducts 36 respectively extend radially from the groove 34 into the bottom of each pocket portion 20b.

In operation, lubricant fed under pressure into the passage 30 flows through the passages 32, groove 34 and ducts 36 to build up a lubricant pressure within each pocket portion 20b beneath a ball and thence to antifrictionally support the ball 22 by a flowing lubricant film between the seat 20a and the ball surface. This lubricant pressure during bearing operation provides a free antifrictional support of the ball within its seat and prevents rubbing contact of the ball against the inner ring 10. Additionally, the lubricant in each pocket beneath the ball aids in antifrictional support of the ball. Also, the leakage of this lubricant between the ball seat and the ball provides desired and ample lubrication for other parts of the bearing including the provision of a suitable lubricant film between the rotating balls 22 and the raceway 26. If desired, a suitable recovery system collects the lubricant leaking from the bearing and returns it under pressure to the system.

In the modification of Figure 4, a reversed condition exists wherein an outer race ring 40 is in relatively rotatable relation to an inner race ring 42 through an intervening series of circumferentially spaced balls 44 which freely roll in a raceway 46 in the inner race ring. These balls individually seat within pockets 50 that are circumferentially spaced and correspondingly positioned in the outer race ring. Each of the pockets 50 has an outer spherical seat portion 50a matingly receiving the peripheral surface of one of the balls 44 and has an inner pocket portion 50b of lesser radius. Lubricant under pressure is fed through one or more suitable pipe connections 56 into a duct 58 in a housing 61 supporting the outer ring 40. The inner end of the duct 60 communicates with a peripheral groove 62 in the outer ring 40 and radially disposed passages in the ring 40 communicate between the groove 62 and the bottom pocket portion 60b of each ball pocket 50. Lubricant, as a light oil, an air oil mist, or a suitable gas, is fed through the pipe connections 56 under pressure from the pipe connections 58 into the bottom of each recess 50b to antifrictionally support each ball in its seat for rotation and out of contact with the race ring 40 during bearing operation. Also, the leakage of the lubricant film enveloping the ball and located between the ball and its seat provides for ample lubrication between each ball and the raceway 46. If desired, this lubricant may be recirculated through the bearing.

My invention, as disclosed in both embodiments provides a construction wherein the rotation of each ball within its interfitting seat builds up a hydrodynamic lubricant pressure between the ball and its receiving pocket which antifrictionally supports the ball whenever lubricant is present in the recess 20b or 50b. When lubricant is fed under sufficient pressure into this recess beneath a ball, a hydrostatic lubricant pressure is developed beneath the ball causing the ball to antifrictionally float on a reservoir of lubricant while this lubricant slowly leaks between the ball and its seat thereby preventing friction contact of the ball against its seat.

I claim:

1. An antifriction bearing comprising a pair of relatively rotatable rings, a series of circumferentially spaced rolling elements between and coaxially positioning said rings, one of said rings having a series of circumferentially spaced pockets each of which receives one of the rolling elements in non-bottoming relation, each pocket having an annular zone in conforming relation to and rotatably receiving a rolling element, each pocket having a cup-shaped lubricant space in its bottom portion beneath the rolling element therein, and said other ring having an annular raceway receiving all of the spaced rolling elements for freely rolling engagement thereagainst.

2. An antifriction bearing comprising a pair of relatively rotatable rings, a series of circumferentially spaced balls between said rings, one of said rings having a series of circumferentially spaced cup-shaped pockets each of which has at its open end an annular seat portion slidably and rotatably receiving one of the balls in non-bottoming relation in one of said pockets, means providing a coating of lubricant between each seat portion and the ball therein, and said other ring having an annular raceway against which the balls are free to roll.

3. An antifriction bearing comprising a pair of relatively rotatable rings, a series of circumferentially spaced rolling elements between said rings, one of said rings having a series of circumferentially spaced pockets opening radially towards said other ring, each pocket having at its open end an arcuate peripheral portion closely conforming in curvature to a sub-equatorial zone on one of the rolling elements which is slidably seated therein in spaced relation to the bottom of the pocket, each pocket having a recess beneath a rolling element, means supplying lubricant under pressure to each recess, said lubricant under pressure supporting each rolling element for antifrictional rotation in its pocket, and said other ring having an annular raceway against which the rolling elements are free to roll.

4. An antifriction bearing comprising a pair of relatively rotatable rings, a series of circumferentially spaced balls between and engageable with said rings, one of said rings having a series of circumferentially spaced cup-shaped pockets opening radially towards the other ring, each pocket having an annular parti-spherical seat portion at its open end closely conforming with the curvature of a ball slidably received therein, each pocket having a bottom recess beyond the seated portion of the ball, the ball-receiving ring having an annular lubricant passage and lubricant passages extending therefrom into each recess, means providing for delivery of lubricant under pressure to the annular lubricant passage, for antifrictional lubricant support of each ball in one of said parti-spherical seat portions, and said other ring having an annular raceway for rollingly receiving said balls.

5. A ball bearing comprising a pair of relatively rotatable race rings, a series of circumferentially spaced balls between said rings and coaxially positioning the rings, one of said rings having a series of circumferentially spaced parti-spherical pockets opening radially outwardly towards the other ring and respectively receiving said balls, each pocket having a radius shorter than the radius of the ball received therein, each pocket having at its open end an annular peripheral zone for matingly and rotatably receiving a sub-equatorial zone of one of the balls and which provides a cup-shaped recess in the bottom of each pocket beneath a ball, means supplying lubricant under pressure into each recess for antifrictionally supporting the balls in the pockets, said lubricant escaping radially outwardly between the mating ball and pocket portions and said other ring having a transversely curved annular raceway for receiving all of the balls in rolling engagement therewith.

6. An antifriction bearing comprising a pair of relatively rotatable rings, a series of circumferentially spaced balls between and coaxially positioning said rings, one of the rings having a series of circumferentially spaced parti-spherical pockets opening towards the other ring and respectively receiving said balls, the radius of the body portion of each pocket being less than the radius of the ball therein, each pocket being provided at its open end with an annular peripheral seat portion having a radius closely equivalent to that of the ball therein and rotatably receiving said ball, the bottom of each pocket providing a lubricant recess beneath the ball, said other ring being divided intermediate its width and having an annular raceway in which the balls rollingly engage, the pocket-containing ring having an annular groove and radial passages therefrom into the bottoms of said pockets, and means supplying lubricant under pressure into said groove whereby the balls will be antifrictionally supported in the pockets and the balls will be spaced from the seats by flowing lubricant.

References Cited in the file of this patent

UNITED STATES PATENTS

| 2,217,801 | Katcher | Oct. 15, 1940 |
| 2,259,324 | Robinson | Oct. 14, 1941 |
| 2,280,659 | Muller | Apr. 21, 1942 |
| 2,712,967 | Sutton | July 12, 1955 |

FOREIGN PATENTS

| 438,382 | Italy | Aug. 6, 1948 |